United States Patent [19]

Schrodt et al.

[11] Patent Number: 4,964,105
[45] Date of Patent: Oct. 16, 1990

[54] REPLACEMENT SWITCH

[75] Inventors: Duane E. Schrodt, Allen; David D. Wilson, McKinney, both of Tex.

[73] Assignee: DSC Communications Corporation, Plano, Tex.

[21] Appl. No.: 265,584

[22] Filed: Nov. 1, 1988

[51] Int. Cl.$^5$ .............................................. H04J 3/02
[52] U.S. Cl. .................................... 370/16; 370/58.1; 371/8.1; 371/11.1
[58] Field of Search ............................ 370/58, 16, 13; 340/825.79, 825.89; 371/8, 11, 8.1, 8.2, 11.1, 11.2; 379/291, 292

[56] References Cited

U.S. PATENT DOCUMENTS

| | | | |
|---|---|---|---|
| 4,402,077 | 8/1983 | Simmons et al. | 370/58 |
| 4,477,895 | 10/1984 | Casper et al. | 371/8 |
| 4,534,027 | 8/1985 | Perry | 370/16 |
| 4,597,079 | 6/1986 | Aoki et al. | 370/16 |
| 4,605,928 | 8/1986 | Georgiou | 379/292 |
| 4,763,316 | 8/1988 | Schaich et al. | 370/16 |
| 4,771,420 | 9/1988 | Deschaine et al. | 370/68 |
| 4,774,703 | 9/1988 | Force et al. | 370/16 |
| 4,817,134 | 3/1989 | Pickens et al. | 379/291 |
| 4,831,617 | 5/1989 | Iwasaki | 370/16 |

Primary Examiner—Douglas W. Olms
Assistant Examiner—Min Jung
Attorney, Agent, or Firm—Baker & Botts

[57] ABSTRACT

A procedure for replacing an existing switch (62) with a greater-capacity replacement switch (12) in a communication system (10) is disclosed. The replacement switch (12) has redundant interconnect memories (40) that can store different interconnect maps. The replacement switch (12) also has logic circuitry (48) that forces the replacement switch (12) to operate using only a selected one of the redundant interconnect memories (40). The procedure loads a transparent map into the interconnect memories. Next, the procedure couples the replacement switch (12) in series between drop facilities (14) and the existing switch (62) and between the existing switch (62) and line facilities (16). The coupling scheme and transparent map route communication through both the replacement switch (12) and the existing switch (62) without substantially affecting service. Next, a master interconnection definition similar to an interconnection definition within the existing switch (62) is loaded into one of the redundant interconnect memories (40) of the replacement switch (12). Operation of the replacement (12) is switched to utilize this master interconnection definition without affecting service.

37 Claims, 2 Drawing Sheets

REPLACEMENT SWITCH

TECHNICAL FIELD OF THE INVENTION

The present invention generally relates to the field of telecommunications. More particularly, the present invention relates to switches in data communication systems and to the upgrading of switching services by replacing one switch with another switch.

BACKGROUND OF THE INVENTION

Switches in data communication systems transfer a plurality of communication spans from a line facility to a drop facility, and vice versa. These spans typically contain a plurality of time division multiplexed channels. Any channel within a span at one of the drop and line facilities may be selectively connected within the switch to any channel of any span at the other of the facilities. Consequently, a switch may support a considerable amount of communication and may contain a relatively complex map that defines a current interconnection scheme between the channels supported by the switch.

Upon occasion, a user of an existing switch may desire to expand its capability. In other words, the user may wish to install a replacement switch having the ability to switch a greater number of channels between drop and line facilities than are currently supported by the existing switch. However, it is usually undesirable to simply de-activate the existing switch, disconnect the existing switch, connect a replacement switch, activate the replacement switch, and establish the map that defines the interconnection scheme in the replacement switch. Such a replacement procedure ends all data communications service for an intolerably long period of time until the replacement switch is fully on-line.

Conventional telecommunication industry standards require equipment and users of communication facilities to tolerate occasional short duration service interruptions. However, long duration outages may severely harm a user of such communication facilities. A loss of service for greater than a few seconds is generally considered service-affecting. Accordingly, it is highly desirable to minimize the possibility of service-affecting interruptions. Moreover, if service-affecting interruptions are unavoidable, then an interruption which affects only a few channels is desirable over a service-affecting interruption which affects all channels supported by an existing switch.

Additional switch hardware may be employed to minimize service-affecting interruptions that might occur as a result of switch replacement. However, such additional hardware may undesirably impact system cost and reliability and seldom is capable of switching large amounts of data communications within an acceptable time frame. Furthermore, the additional equipment must be removed after the switch over to the new switching equipment is completed. Therefore, a need exists for a replacement switch and a procedure for replacing an existing switch which minimizes service interruptions and which minimizes the amount of hardware that is dedicated solely to the replacement procedure.

SUMMARY OF THE INVENTION

Accordingly, it is an advantage of the present invention that an improved switch and method for the replacement of switches is provided.

Another advantage of the present invention is that an improved method of replacing switches is provided so that service interruptions are minimized.

Yet another advantage of the present invention is that an improved method of replacing switches is provided so that a minimum amount of hardware is dedicated to switch replacement.

The above and other advantages of the present invention are carried out in one form by a method of replacing an existing switch with a replacement switch. The method constructs two redundant interconnect memories within the replacement switch so that the memories may store distinct interconnect maps and so that either one of the redundant interconnect memories may be selected to establish the interconnection scheme for the entire replacement switch. A primary interconnect map is generated using interconnect data which is obtained from the existing switch. An alternate interconnect map is generated to establish a predetermined interconnection definition. Either interconnect map may then be stored in either or both of the memories, thereby establishing the ultimate interconnect scheme for the replacement switch. Next, the first and second switches are electrically coupled in series between line and drop facilities. The replacement switch then uses only the second interconnect memory to establish the interconnection definition for the entire replacement switch. After the replacement switch is completely coupled in series with the existing switch between the line and drop facilities, the first interconnect memory is used for operation of the replacement switch so that signals between the line and drop facilities are routed only through the replacement switch.

BRIEF DESCRIPTION OF THE DRAWINGS

A more complete understanding of the present invention may be derived by referring to the detailed description and claims when considered in connection with the accompanying drawings, wherein like reference numbers refer to similar items, and:

DETAILED DESCRIPTION OF THE PREFERRED EMBODIMENT

Figure 1:
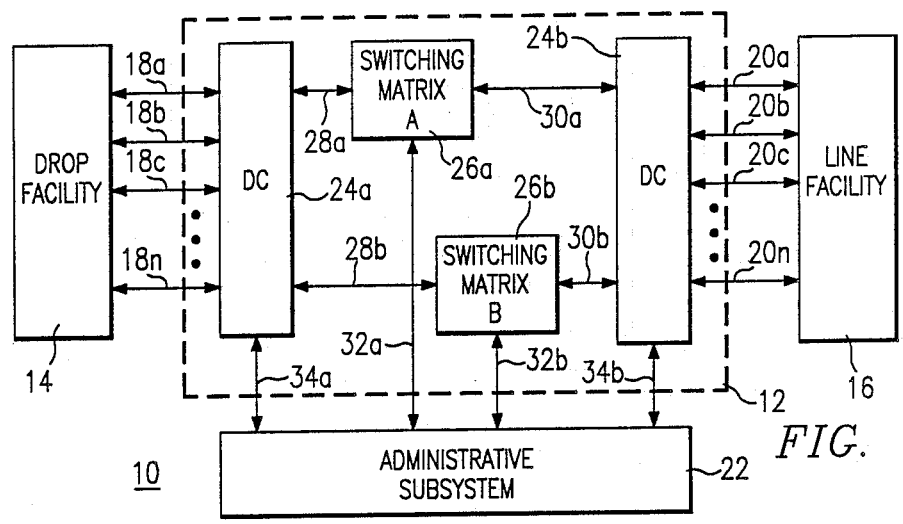
FIG. 1 shows a simplified block diagram of a replacement switch in accordance with the present invention.

FIG. 1 shows a block diagram of a data communication system 10 that utilizes a replacement switch 12. The block diagram of switch 12 presents a simplified version of a "time" cross-connect switch which is used in connection with the present invention. A more detailed description of a specific switch with which the present invention may be practiced may be found in U.S. Pat.

No. 4,771,420, entitled Time Slot Interchange Digital Switched Matrix, issued Sept. 13, 1988, by Stephen Alexander Deschaine and Michael Kenneth Corry or Ser. No. 148,383, entitled Digital Bridge For A Time Slot Interchange Digital Switched Matrix, filed Jan. 25, 1988, by Stephen Alexander Deschaine both of which are assigned to the assignee of the present invention and are incorporated herein by reference. Furthermore, the replacement switch of the present invention may also be used for the DEX ECS1 and DEX ECS3, both of which are "space" cross-connect switches. However, those skilled in the art will understand by referring to the discussion herein that the present invention does not require the specific cross-connect switch structures described above, but may alternatively utilize many conventional switching structures known to those skilled in the art so long as such structures incorporate the features discussed herein.

Switch 12 couples between a drop facility 14 and a line facility 16. For the purposes of the present invention, drop facility 14 and line facility 16 may comprise any one of a number of terminations or cross-connections. such as DS3 terminations or DS1 cross-connections. For example, the drop facility 14 could be DS3s while the line facility 16 comprises DS1s. The facilities are substantially different, yet retained is the ability to properly interface to the existing switch and to be able to map the same cross-connections as the existing switch. Each of drop facility 14 and line facility 16 supports a multiplicity of data channels. In the preferred embodiment, drop facility 14 and line facility 16 each have a plurality of T1 spans, or digroups, each of which contain twenty-four TO channels. Furthermore, in the preferred embodiment, the switch 12 has numerous drop ports, collectively referred to as drop ports 18a, 18b, 18c, and 18n and numerous line ports, collectively referred to as line ports 20a, 20b, 20c, and 20n. The number of drop ports and line ports is simply twice that of the existing switch 62 (see FIG. 5). One T1 span is received and supplied by each of drop ports 18a-18n and line ports 20a-20n.

In addition, an administrative subsystem 22 couples to switch 12. Administrative subsystem 22 represents a conventional computing device which includes a hardware interface (not shown) that supplies digital control bits to various portions of switch 12. Computing device 22 may contain a terminal (not shown) and a printer (not shown) through which a user may communicate with administrative subsystem 22 and switch 12 and through which errors may be reported to a user of administrative subsystem 22 and switch 12.

Switch 12 additionally includes a digroup controller 24a which couples to drop ports 18a-18n and a digroup controller 24b which couples to line ports 20a-20n. Digroup controllers 24a-24b are substantially similar to each other. Digroup controllers 24a-24b rearrange data flowing between switch 12 and drop facility 14 or switch 12 and line facility 16 so that the data format takes full advantage of a memory access time parameter of a signal memory (discussed below). Accordingly, digroup controller 24a formats a predetermined number of channels per frame at drop ports 18a-18n so that the channels are compatible with conventional T1 spans. Likewise, digroup controller 24b does the same thing with data supplied at link ports 20a-20n.

Digroup controller 24a couples to a switching matrix 26a at a drop link 28a, and to switching matrix 26b at a drop link 28b. Likewise, switching matrix 26a couples to digroup controller 24b at a line link 30a, and switching matrix 26b couples to digroup controller 24b at a line link 30b.

Switching matrix 26a is substantially similar to switching matrix 26b so that switch 12 may provide redundant switching operation. Consequently, during normal operation of switch 12, communication data supplied on a predetermined channel at drop facility 14 goes to digroup controller 24a at one of drop ports 18a-18n. In digroup controller 24a, this predetermined channel of data is reformatted relative to all other channels of data received by digroup controller 24a and presented to both of switching matrices 26a-26b. Switching matrices 26a-26b temporarily store this predetermined channel of data so that it may be delivered at a later time to an appropriate channel of line facility 16. When a time slot corresponding to this appropriate channel occurs, this predetermined channel of data is retrieved from switching matrices 26a-26b and supplied to digroup controller 24b. Digroup controller 24b selects which of the two data items from the two switching matrices to output at one of line ports 20a-20n so that the appropriate channel of line facility 16 will receive the data. Likewise, data originating at line facility 16 may be routed through digroup controller 24b and switching matrices 26a and 26b for delivery at an appropriate channel in drop facility 14.

A particular interconnection definition utilized by switching matrices 26a and 26b is provided by administrative subsystem 22 at administrative subsystem links 32a and 32b, which couple to switching matrices 26a and 26b, respectively. Likewise, the selection of outputs from switching matrices 26a and 26b occurs in digroup controller 24b in accordance with control signals supplied from administrative subsystem 22. Thus, administrative subsystem 22 couples to digroup controller 24a at an administrative subsystem link 34a and to digroup controller 24b at an administrative subsystem link 34b.

Figure 2:
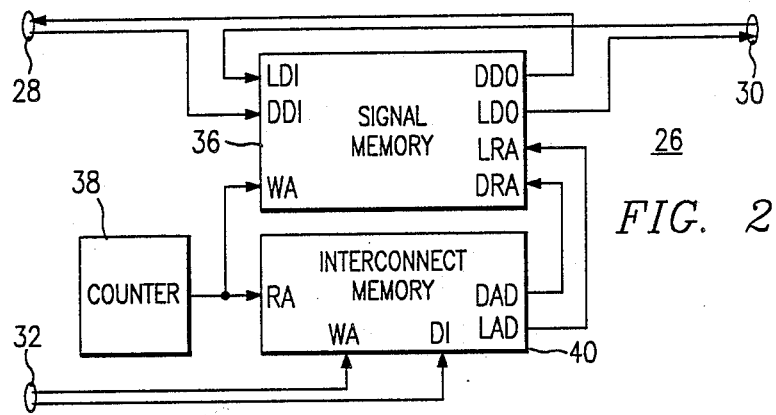
FIG. 2 shows a block diagram of a switching matrix portion of the replacement switch depicted in FIG. 1.

FIG. 2 shows a block diagram of switching matrices 26a-26b in FIG. 1. Since switching matrices 26a-26b are substantially identical to one another, the switching matrix presented in FIG. 2 is simply referred to as switching matrix 26. Likewise, drop and line links are simply referred to as drop and line links 28 and 30 and the administrative subsystem link as administrative subsystem link 32.

An input signal supplied by drop link 28 couples to a drop data input of a signal memory 36, and an input signal from line link 30 couples to a line data input of signal memory 36. A drop data output of signal memory 36 couples to an output of drop link 28, and a line data output of signal memory 36 couples to an output of line link 30. A counter 38 has an output which couples to a write address input of signal memory 36 and to a read address input of an interconnect memory 40. A drop address output of interconnect memory 40 couples to a drop read address of signal memory 36, and a line address output of interconnect memory 40 couples to a line read address of signal memory 36. An address bus from administrative subsystem link 32 couples to a write address input of interconnect memory 40, and a databus from administrative subsystem link 32 couples to a data input of interconnect memory 40.

Signal memory 36 and interconnect memory 40 are memory devices. These memory devices are shown in FIG. 2 as being two-port memories. However, a switching matrix utilized in connection with the present invention need not incorporate this specific type of memory.

Generally speaking, switching matrix 26 provides the switching function of switch 12 (see FIG. 1). Switching matrix 26 receives source channel data from drop link 28. At a time slot determined by administrative subsystem 22 through interconnect memory 40, switching matrix 26 supplies this data to a target channel at line link 30. Likewise, switching matrix 26 simultaneously receives source channel data from line link 30 and supplies this data at an appropriate time slot to drop link 28.

Counter 38, which is synchronized with the framing of data supplied to switch 12, increments or decrements in step with each new item of data appearing at links 28 and 30. The output of this counter forms the address to signal memory 36 for both drop and link data stored in switching matrix 26. In other words, an address or location in signal memory 36 at which a channel's data is stored corresponds to a time slot associated with the channel's position within a frame. Later, the channel of data is retrieved from signal memory 36 at a time slot which corresponds to the time slot for the target channel. When the target channel's time slot occurs, a map or lookup table contained in interconnect memory 40 defines the source channel (or location in signal memory 36) from which data is retrieved for application at links 28 and 30 during the target time slot.

Referring back to FIG. 1, since switch 12 contains two switching matrices 26a-26b, and since each switching matrix 26 contains a unique interconnect memory 40, redundant operation is supported. During normal operation of switch 12, the two interconnect memories 40 contain identical maps, each of which establish the interconnection definition for switch 12. Thus, outputs provided by switching matrices 26a and 26b match at all times under normal operating conditions except when a failure occurs.

Figure 3:
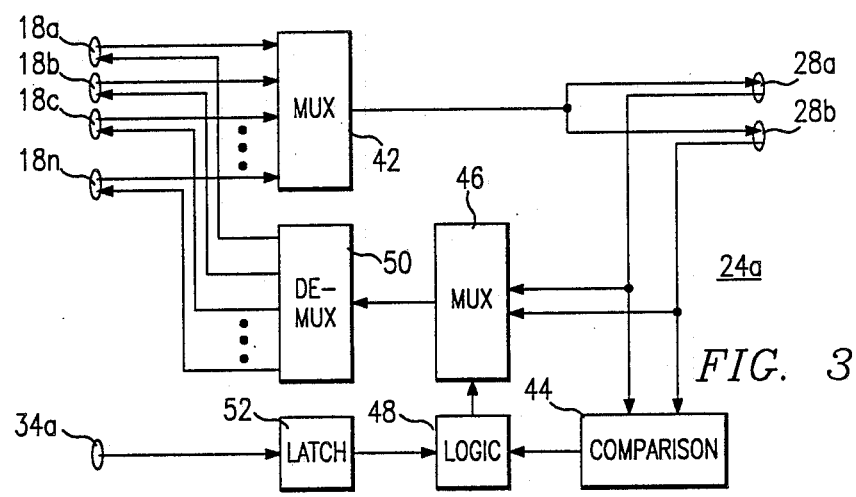
FIG. 3 shows a block diagram of a digroup controller portion of the replacement switch shown in FIG. 1.

FIG. 3 shows a block diagram of digroup controller 24a. Since digroup controllers 24a-24b (see FIG. 1) are identical in the preferred embodiment, the structure shown in FIG. 3 describes digroup controller 24b as well. In FIG. 3, outputs from drop ports 18a-18n couple to inputs of a multiplexer 42. An output of multiplexer 42 couples to inputs of drop links 28a and 28b. As discussed above, digroup controller 24a reformats data received from drop facility 14 (see FIG. 1) into a form which takes full advantage of an access time parameter for signal memory 36 (see FIG. 2). Consequently, multiplexer 42 may employ any of several different circuit architectures to accomplish this reformatting. However, in a typical application multiplexer 42 essentially transfers the same number of channels per frame out of multiplexer 42 at a high data rate on a few ports as are received at inputs of multiplexer 42 at a low rate on many ports.

Signals provided at drop links 28a and 28b couple to a comparison circuit 44 and to inputs of a select switch multiplexer 46, respectively. Comparison circuit 44 is select switch utilized in redundant circuits to detect the difference between two signals. Consequently, under normal operating conditions an output of comparison circuit 44 is routed through a logic circuit 48 to a selection input of select switch multiplexer 46 to select one of switching matrices 26a and 26b for supplying data to drop facility 14 (see FIG. 1). It will be understood by those skilled in the art, that comparison circuit 44 may include additional features which promote the redundancy of switch 12. However, such features are conventional in nature and are not shown in FIG. 3. An output of select switch multiplexer 46 couples to an input of a demultiplexing circuit 50 which reformats data supplied by switching matrices 26a or 26b into the form anticipated by drop facility 14. Consequently, outputs from demultiplexing circuit 50 couple to drop ports 18a-18n.

In addition, administrative subsystem link 34a couples to a latch 52, and an output of latch 52 couples to an input of logic circuit 48. Latch 52 stores data bits supplied by administrative subsystem 22 (see FIG. 1) to control the operation of digroup controller 24a. Latch 52 may additionally supply data to administrative subsystem 22 to indicate the status of digroup controller 24a.

During a replacement operation, control bits stored in latch 52 cause logic circuit 48 to operate in one of three modes. In an "unlock" mode, digroup controller 24a operates in a normal, redundant mode of operation where comparison circuit 44 monitors outputs from switching matrices 26a-26b (see FIG. 1). Thus, in this unlocked mode, logic circuit 48 permits the output from comparison circuit 44 to control the selection input of select switch multiplexer 46. However, in a "lock-A" mode logic circuit 48 overrides the output signal generated by comparison circuit 44 and forces select switch multiplexer 46 to select the output from switching matrix 26a for application to drop facility 14 (see FIG. 1). Similarly, in a "lock-B" mode logic circuit 48 overrides the output from comparison circuit 44 and forces select switch multiplexer 46 to select the output from switching matrix 26b for application to drop facility 14. As a consequence of these three modes of operation, the interconnection map stored in switching matrix 26a may differ from the interconnection map stored in switching matrix 26b. Although comparison circuit 44 will indicate the occurrence of errors due to the use of unequal interconnection maps, the output from comparison circuit 44 may be overridden and select switch multiplexer 46 may be forced to select outputs from either one of the switching matrices 26a-26b.

Figure 4:
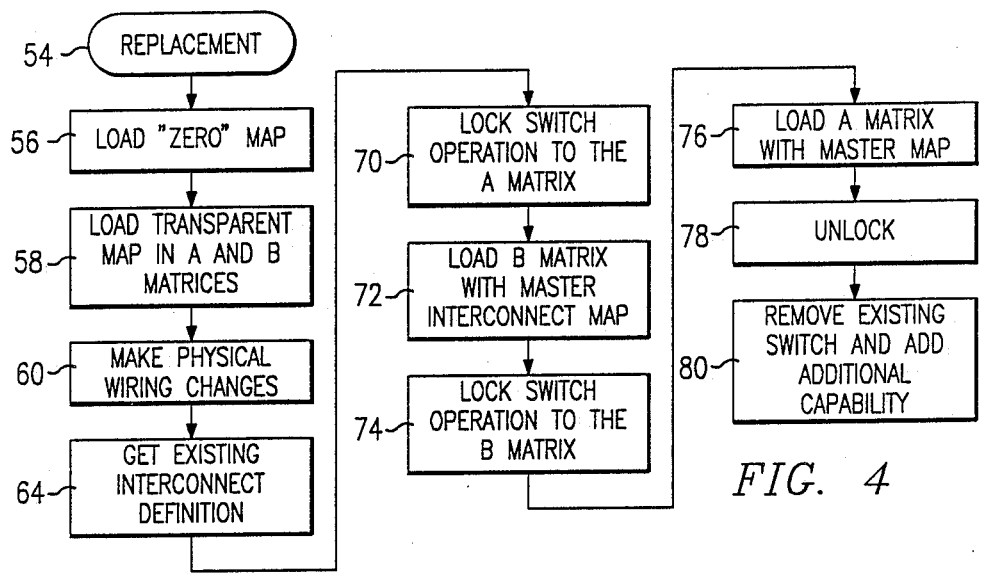
FIG. 4 shows a flow chart of tasks performed in accordance with the present invention.

FIG. 4 shows a flow chart of a general replacement procedure 54 followed by the present invention in replacing an existing switch with replacement switch 12 (see FIG. 1). An optional task 56 may be performed in procedure 54 by loading a "zero" map into both interconnect memories 40 (see FIG. 2) of switching matrices 26a and 26b (see FIG. 1). This zero map establishes an interconnection definition for switch 12 in which no channels at drop ports 18a-18n connect to line ports 20a-20n, and no channels at line ports 20a-20n connect to drop ports 18a-18n. In other words, task 56 performs a reset function.

Next, a task 58 loads a transparent map into interconnect memories 40 (see FIG. 2) of switching matrices 26a and 26b. The transparent map is so named in that it maps incoming information through to the replacement switch 12 without disrupting that information, and therefore is transparent to the existing data link. Thus the existing switch can continue, to operate as if the replacement switch 12 were not present. In the present invention, replacement switch 12 has a larger capacity than an existing switch which it is replacing. In other words, replacement switch 12 has a greater number of drop ports 18a-18n and of line ports 20a-20n than the existing switch which it is replacing. Some of these drop and line ports of replacement switch 12 simply replace drop and line ports on the existing switch. However, other drop and line ports of replacement switch 12 are additional ports which provide additional capacity.

Task 58 first identifies which ports are replacement ports and which ports are additional ports. The transparent map generated by task 58 and stored in switching matrices 26a and 26b connects all channels on spans at replacement drop ports to common spans at additional line ports, and vice-versa. Moreover, the transparent map generated by task 58 causes channels to retain their relative order within a frame at the drop and line ports between which they are switched.

For example, the existing switch which replacement switch 12 replaces may support only 128 drop ports and 128 line ports. The preferred embodiment of replacement switch 12 contains numerous drop ports and line ports, the number thereof being twice that of the existing switch. Consequently drop port numbers 1–128 and line port numbers 1–128 of replacement switch 12 may be designated as replacement ports while replacement switch drop and line port numbers greater than 128 may be designated as additional ports. The transparent map generated by task 58 may connect channels 1–24 of a T1 span applied at replacement drop port number 1 to channels 1–24, respectively, of the T1 span at additional line port number 129, and vice versa. Likewise, this transparent map may connect channels 1–24 of the T1 span applied at replacement drop port number 128 to channels 1–24, respectively, for the span occurring at additional line port number 256. The dotted lines shown in FIG. 5 illustrate this transparent map which task 58 loads into switching matrices 26a and 26b (see FIG. 1).

Figure 5:
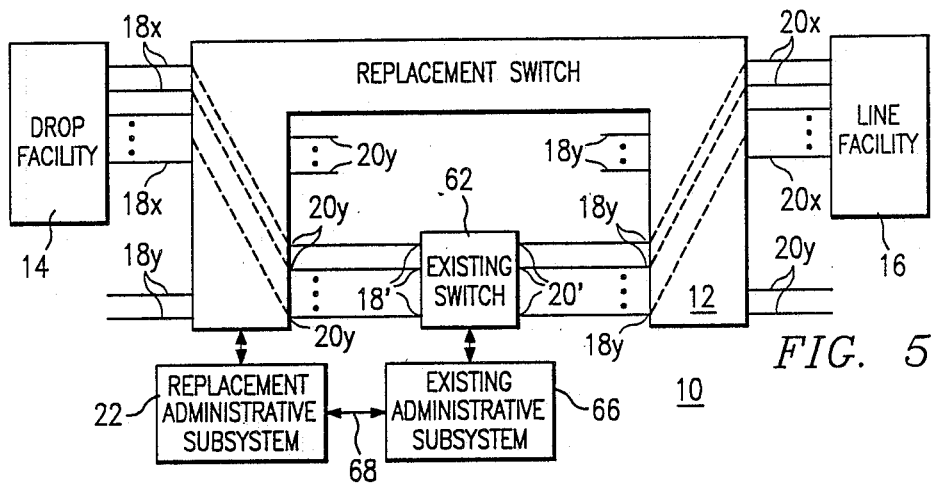
FIG. 5 illustrates electrical connections and a transparent interconnect map utilized in accordance with the present invention.

After task 58, a task 60 specifies the performance of the physical wiring changes which couple replacement switch 12 into system 10 in the manner illustrated in FIG. 5. Upon initiating task 60, an existing switch 62 is coupled between drop facility 14 and line facility 16. Existing switch 62 has drop ports 18', which couple to drop facility 14, and line ports 20', which couple to line facility 16 (coupling not shown). Thus, at the initiation of task 60, replacement switch 12 is not coupled into system 10. During task 60, existing switch 62 operates normally. In other words, communications are continually routed between drop facility 14 and line facility 16 through existing switch 62, and existing switch 62 contains a definition for the interconnection pattern between channels of drop facility 14 and channels of line facility 16. In addition, replacement switch 12 operates using the transparent map discussed above in connection with task 58.

FIG. 5 references replacement drop ports, discussed above in connection with task 58 of FIG. 4, as drop ports 18x and additional drop ports as drop ports 18y. Likewise, FIG. 5 references replacement line ports as line ports 20x and additional line ports as line ports 20y. A replacement drop port 18x and a corresponding replacement line port 20y represent a port pair. Alternatively, a replacement drop port 18y and a corresponding replacement line port 20x represent a port pair. It will be understood by those skilled in the art that a line port may be viewed as corresponding to a drop port, or vice versa, when the transparent map discussed above in connection with task 58 of FIG. 4 connects channels applied at drop port 18x or 18y of the pair to line port 20y or 20x of the same pair. In the preferred embodiment of the present invention, port pairs are connected one at a time in series with drop ports 18' of existing switch 62 for all of drop ports 18'. Next, port pairs are connected one at a time in series with line ports 20' of existing switch 62 for all line ports 20'. Each port pair connection is completed prior to beginning the next port pair connection.

The precise order and manner of making a single port pair connection depends upon the equipment used in coupling existing switch 62 to drop facility 14 and line facility 16. Those skilled in the art can devise schemes to minimize the time required to make such connections. However, the preferred embodiment of the present invention replaces all hard-wired jumpers between drop and line facilities 14 and 16 and existing switch 62 with patch cords prior to making such connections. The use of patch cords allows a drop port 18' of existing switch 62 to be disconnected from drop facility 14 and reconnected to an additional line port 20y of replacement switch 12 while a corresponding replacement drop port 18x of replacement switch 12 is coupled to drop facility 14, at a location where the removed drop port 18' previously coupled, in a minimum amount of time. In the preferred embodiment, such a coupling can take place in less than a couple of seconds when patch cords are utilized to make these connections.

Consequently, task 60 of FIG. 4 contemplates that existing switch 62 continues to operate while replacement switch 12 is being coupled into system 10 so that the entire system 10 is not disabled at any time. The particular channels which are being routed between existing switch 62 and either drop facility 14 or line facility 16 when a port pair is coupled into system 10 may experience some reframing. However, this reframing affects only a few of the total number of channels supported by existing switch 62. Moreover, when hardware jumpers are replaced with patch cords, the coupling of a port pair of replacement switch 12 in series with existing switch 62 may take place in less than a couple of seconds.

Referring back to FIG. 4, after task 60, a task 64 obtains an existing interconnect definition for system 10. Typically, this interconnect definition is transferred to administrative subsystem 22 from an existing administrative subsystem 66 over a data link 68, as shown in FIG. 5. This definition typically represents hardware independent, high-level commands. In addition, this existing interconnect definition includes trunk conditioning codes, trouble word, and bridging connection information. On the other hand, nothing in the preferred method of the present invention suggests that such data could not be entered manually into administrative subsystem 22. During task 64 in procedure 54, system 10 is operating normally under the switch definition contained in existing switch 62. Consequently, no critical need to hurry exists.

In addition, task 64 compiles these commands into a master interconnect map suitable for use in replacement switch 12. The particular technique used in generating this master interconnect map is not critical in the present invention. Moreover, it is conventional in switches to translate, for example, TR-170 MML compatible equipment commands into necessary data patterns that cause switching to occur. Such conventional techniques are contemplated in task 64.

After task 64, a task 70 locks operation of replacement switch 12 to switching matrix 26a (see FIGS. 1 and 3). The "lock-A" mode of operation was discussed above in connection with FIG. 3. Consequently, after task 70, replacement switch 12 does not operate in a redundant mode, but simply utilizes the transparent interconnect map stored within interconnect memory 40 (see FIG. 2) of switching matrix 26a (see FIG. 1).

After task 70, a task 72 loads interconnect memory 40 (see FIG. 2) of switching matrix 26b (see FIG. 1) with the master interconnect map. This interconnect definition was obtained above in task 64. At the completion of task 72, interconnect maps contained in interconnect memories 40 (see FIG. 2) of switching matrices 26a and 26b (see FIG. 1) differ from one another. However, the operation of replacement switch 12 utilizes only the transparent map stored in matrix 26a at this point.

After task 72, a task 74 locks the operation of replacement switch 12 to switching matrix 26b (see FIG. 1) As discussed above in connection with task 72, switching matrix 26b contains the master interconnect map, which corresponds to the interconnect map within existing switch 62 (see FIG. 5). This locking task causes the operation of replacement switch 12 to instantly switch to switching matrix 26b. Consequently, task 74 is where the actual replacement of existing switch 62 with replacement switch 12 occurs. Since this replacement occurs instantly, only minor amounts of reframing occur. The service supplied by system 10 remains substantially unaffected. At the completion of task 74, all communication traffic is routed entirely through replacement switch 12. This situation is depicted by the dotted line shown in FIG. 6.

After task 74, a task 76 loads switching matrix 26a with the master map which was generated above in connection with task 64 and loaded into switching matrix 26b during task 72. Consequently, after task 76 interconnect memories 40 in both of switching matrices 26a-26b contain identical data.

Figure 6:
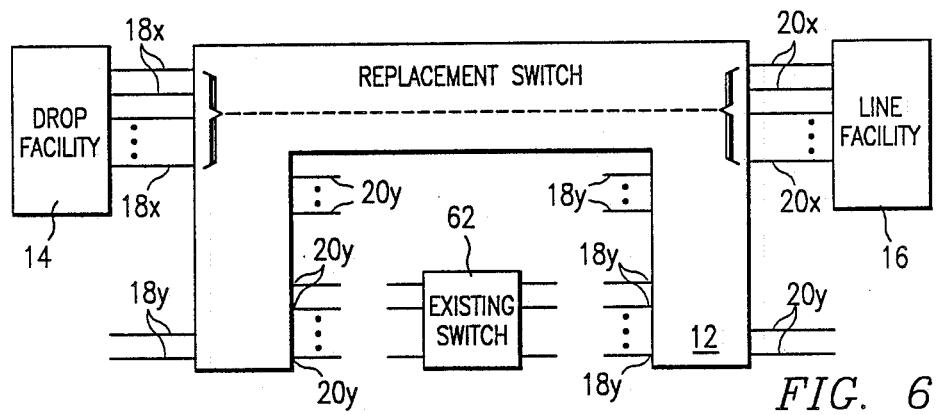
FIG. 6 illustrates a master interconnect map utilized in accordance with the present invention.

Next, a task 78 unlocks the operation of replacement switch 12 so that replacement switch 12 operates in a normal, redundant mode. After task 78, a task 80 now physically removes existing switch 22 from replacement switch 12, as shown in FIG. 6. Additional switching capability may now be connected to replacement switch 12 at additional drop ports 18y and additional line ports 20y.

In summary, the present invention provides a switch and a method for replacing an existing switch in a communication system. The present invention minimizes service interruption. By using patch cords to perform the wiring changes and by performing all connections one port pair at a time, any interruption in service is limited to only a single T1 span for less than a time period greater than one second. The entire switch never fails to provide service. In addition, only an insignificant amount of additional hardware is required to support this replacement capability. The method of the present invention merely permits redundant hardware to be temporarily switched so that it may be used for the replacement procedure. Still further, the existing switch which is replaced need not have any specific design or architecture in the method of the present invention.

The foregoing description discusses a preferred embodiment of the present invention which may be changed or modified without departing from the scope of the present invention. For example, the particular order of tasks shown in procedure 54 of FIG. 4 is not critical. Thus, the existing interconnect definition may be obtained at any point in the procedure and need not occur at the precise location specified in FIG. 4. In addition, the switch hardware and facility characteristics discussed herein are not critical to the present invention but may be changed or modified without departing from the scope of the present invention. These and other changes and modifications are intended to be included within the scope of the present invention.

What is claimed is:

1. A method of minimizing switching service interruption while transferring a plurality of communication spans between drop and line facilities when replacing an existing switch with a replacement switch that has first and second switching matrices therein, and of providing redundant switching service through said replacement switch, said method comprising the steps of:

coupling said replacement switch between said drop and line facilities;

operating said existing switch while coupling said replacement switch between said drop and line facilities;

operating said replacement switch so that said communication spans are transferred between said drop and line facilities through said first matrix of said replacement switch;

rapidly switching the transfer of the communication spans from said first matrix to said second matrix of said replacement switch, wherein said second matrix is operable to transfer all the communication spans; and operating, after said rapidly switching step, said replacement switch to utilize either one of said first and second matrices in transferring said communication spans between said drop and line facilities so that redundant switching service results.

2. A method as claimed in claim 1 additionally comprising the step of physically removing said existing switch after said instantly switching step.

3. A method as claimed in claim 1 additionally comprising the step of coupling said replacement switch with said existing switch between said drop and line facilities.

4. A method as claimed in claim 3 wherein:

said step of coupling said replacement switch includes coupling drop port pairs of said replacement switch between said drop facility and said existing switch, and 'completely coupling one of said drop port pairs between said drop facility and said existing switch before beginning to couple another of said pairs between said drop facility and said existing switch.

5. A method as claimed in claim 4 wherein:

said coupling step additionally couples line port pairs of said replacement switch between said existing switch and said line facility; and said coupling step completely couples one of said line port pairs between said existing switch and said line facility before beginning to couple another of said pairs between said existing switch and said line facility.

6. A method as claimed in claim 5 wherein said existing switch has line and drop ports and said coupling step couples one of said ports to each of said existing switch line and drop ports.

7. A method as claimed in claim 1 wherein each of said communication spans contains a plurality of channels, said communication spans are transferred through said replacement switch between replacement switch drop and line ports, and said method additionally comprises the step of configuring said first matrix during said operating step wherein said first matrix transfers said communication spans, so that all channels within any one of said plurality of communication spans at one of said replacement switch drop ports are switched to a communication span at one of said replacement switch line ports.

8. A method as claimed in claim 7 additionally comprising the step of configuring said first matrix in said operating step wherein said first matrix switches said communication spans, so that the relative order in which channels occur at said one drop port communication span is preserved in said span at said one of said line ports.

9. A method of replacing a first switch coupled between drop and line facilities with a second switch having first and second interconnect memories which are capable of storing first and second interconnect maps, respectively, wherein either of said interconnect memories is selectable to establish an interconnection definition for the entirely of said second switch, the method comprising:
generating the first interconnect map using interconnect data obtained from the first switch and storing the first interconnect map in the first interconnect memory;
generating the second interconnect map to establish a predetermined interconnect definition and storing the second interconnect map in the second interconnect memory;
electrically coupling the second switch in series with the first switch;
selecting the first interconnect memory for operation of the second switch during said coupling step so that signals between the drop and line facilities are routed through both of the first and second switches, wherein said second switch provides a redundant switch path; and
selecting, after said coupling step, the second interconnect memory for operation of the second switch so that signals between the drop and line facilities are routed only through the second switch following said predetermined interconnect definition.

10. A method as claimed in claim 9 additionally comprising the step of uncoupling said first switch from said second switch after said first interconnect memory selection step.

11. A method as claimed in claim 9 wherein said coupling step couples a first portion of said second switch between said line facility and said first switch and a second portion of said second switch between said drop facility and said first switch.

12. A method as claimed in claim 9 wherein said second switch is configured to transfer a plurality of communication spans between drop ports of said second switch and line ports of said second switch, wherein each of said spans contains a plurality of channels, and the method additionally comprises the step of configuring said second interconnect map so that all channels within one of said plurality of communication spans at said drop ports are switched to a single communication span at one of said line ports when said second switch is operated using said second interconnect map to establish an interconnect definition for said second switch.

13. A method as claimed in claim 12 wherein said second interconnect map is additionally configured so that the relative order in which channels occur at said one drop port communication span is preserved in said single line port communication span.

14. A method as claimed in claim 9 wherein said constructing step constructs said second switch to have a switching capacity which is greater than the switching capacity of said first switch.

15. A method as claimed in claim 14 wherein said constructing step constructs said second switch to have a switching capacity which is at least twice the switching capacity of said first switch.

16. A method as claimed in claim 9 wherein:
said coupling step couples second switch drop and line port pairs between said drop facility and said first switch; and
said coupling step completely couples one of said pairs between said drop facility and said first switch before beginning to couple another of said pairs between said drop facility and said first switch to minimize service interruption.

17. A method as claimed in claim 16 wherein:
said coupling step additionally couples second switch drop and line port pairs between said first switch and said line facility; and
said coupling step completely couples one of said pairs between said first switch and said line facility before beginning to couple another of said pairs between said first switch and said line facility.

18. A method as claimed in claim 17 wherein said first switch has line and drop ports, and said coupling step additionally couples one of said pairs to each of said first switch line and drop ports.

19. A method of minimizing switching service interruption while transferring a plurality of communication spans between drop and line facilities when replacing an existing switch with a replacement switch that has first and second switching matrices therein, and of providing redundant switching service through said replacement switch, said method comprising the steps of:
coupling a first portion of drop and line port pairs of said replacement switch between said drop facility and drop ports of said existing switch so that one of said first portion of pairs couples to each of said existing switch drop ports;
coupling a second portion of said drop and line port pairs of said replacement switch between line ports of said existing switch and said line facility so that one of said second portion of pairs couples to each of said existing switch line ports;
operating said existing switch and said replacement switch during said first and second portion coupling steps;
operating, after said replacement switch has been coupled in series with said existing switch between said drop and line facilities, said replacement switch so that said communication spans are transferred between said drop and line facilities only through said first matrix of said replacement switch and said existing switch;
configuring said first matrix during said first matrix operating step so that all channels within one of said plurality of communication spans at one of said replacement switch drop ports are switched to a single communication span at one of said replacement switch line ports and so that the relative order in which channels occur at said one drop port communication span is preserved in said single span;
instantly switching operation of said replacement switch so that said communication spans are transferred between said drop and line facilities only through said second matrix of said replacement switch after said first matrix operating step so that said communication spans are switched away from said existing switch to said replacement switch instantly; and operating, after said instantly switching step, said replacement switch to utilize either one of said first and second matrices in transferring said communication spans between said drop and line facilities so that redundant switching service results.

20. An apparatus for replacing an existing switch with a replacement switch having line and drop ports, connected between a plurality of communication spans between drop and line facilities wherein the replacement switch has first and second switching matrices therein, and a redundant switching service through the replacement switch, comprising:

means for operating the existing switch while coupling the replacement switch between the drop and line facilities;

means for operating the replacement switch so that the communication spans are transferred between the drop and line facilities only through the first matrix of the replacement switch after the replacement switch has been coupled between the drop and line facilities;

means for switching the transfer of the communication spans from said first matrix to the second matrix of the replacement switch, wherein said second matrix is operable to transfer all the communication spans; and means for operating, after switching the replacement switch through the second matrix, the replacement switch to utilize either one of the first and second matrices in transferring the communication spans between the drop and line facilities so that redundant switching service results.

21. The replacement switch of claim 20 and further comprising means for physically removing the existing switch after said switching operation of the replacement switch.

22. The replacement switch of claim 20 and further comprising means for coupling the replacement switch with the existing witch between the drop and line facilities.

23. The replacement switch of claim 22 wherein said means for coupling further comprises:

means for connecting port pairs of the replacement switch between the drop facility and the existing switch; and means for connecting one of said pairs between the drop facility and the existing switch before beginning to couple another of said pairs between the drop facility and the existing switch.

24. The replacement switch of claim 22 wherein said means for coupling further comprises:

means for connecting port pairs of the replacement switch between the existing, switch and the line facility; and means for connecting one of said pairs between the existing switch and the line facility before beginning to couple another of said pairs between the existing switch and the line facility.

25. The replacement switch of claim 22 wherein said means for coupling further comprises means for connecting said pairs to each of the existing switch line and drop ports.

26. A replacement switch for coupling between drop and line facilities for replacing an existing switch having line and drop ports, the replacement switch having first and second interconnect memories therein which are capable of storing first and second interconnect maps, respectively, wherein either of said interconnect memories is selectable to establish an interconnection definition for the entirety of the replacement switch, comprising:

means for generating the first interconnect map using interconnect data obtained from the existing switch and storing the first interconnect map in the first interconnect memory; means for generating the second interconnect map to establish a predetermined interconnect definition and storing the second interconnect map in the second interconnect memory;

means for electrically coupling the replacement switch in series with the existing switch;

first means for selecting the first interconnect memory for operation of the replacement switch while utilizing said electrically coupling means so that signals between the drop and line facilities are routed through the existing switch and the replacement switch;

second means for selecting, after utilizing said electrically coupling means, the second interconnect memory for operation of the replacement switch so that signals between the drop and line facilities are routed only through the replacement switch.

27. The replacement switch of claim 26 and further comprising means for uncoupling the existing switch from the replacement switch after utilizing said second selecting means.

28. The replacement switch of claim 26 wherein said means for electrically coupling comprises means for connecting a first portion of the replacement switch between the line facility and the existing switch and a second portion of the replacement switch between the drop facility and the existing switch.

29. The replacement switch of claim 26 further comprising means for configuring the replacement switch to transfer a plurality of communication spans between drop ports of the replacement switch and line ports of the replacement switch, wherein each of said spans contains a plurality of channels, and the said configuring means additionally comprises a second interconnect map configured so that all channels within one of said plurality of communication spans at said drop port are switched to a single communication span at one of said line ports when the replacement switch is operated using said second interconnect map to establish an interconnect definition for the replacement switch.

30. The replacement switch of claim 29 and further comprising means for configuring said second interconnect map so that the relative order in which channels occur at said one drop port communication span is preserved in said single line port communication span.

31. The replacement switch of claim 26 and further comprising means having a switching capacity which is greater than the switching capacity of the existing switch.

32. The replacement switch of claim 26 and further comprising means having a switching capacity which is at least twice the switching capacity of said first switch.

33. The replacement switch of claim 26 wherein said means for electrically coupling further comprises:

first means for connecting replacement switch drop and line port pairs between said drop facility and the existing switch; and second means for completely connecting one of said pairs between the drop facility and the existing switch before beginning to couple another of said pairs between the drop facility and the existing switch to minimize service interruption.

34. The replacement switch of claim 26 wherein said means for electrically coupling further comprises:
   first means for connecting replacement switch drop and line port pairs between the existing switch and the line facility; and
   second means for completely connecting one of said pairs between the existing switch and the line facility before beginning to couple another of said pairs between the existing switch and the line facility.

35. The replacement switch of claim 34 wherein said means for electrically coupling further comprises means for connecting one of said pairs to each of the existing switch line and drop ports.

36. A replacement switch for replacing an existing switch for transferring a plurality of communication spans from a line facility to a drop facility, comprising:
   a first switching matrix;
   means for configuring said first switching matrix;
   a second switching matrix;
   means for configuring said second switching matrix differently from said first switching matrix; and
   means, coupled to said first and second switching matrices, for deselecting said existing switch and for selecting only one of said first and second switching matrices to transfer said plurality of communication spans.

37. A replacement switch for transferring a plurality of communication spans from a line facility to a drop facility, comprising:
   a first switching matrix;
   means for configuring said first switching matrix;
   a second switching matrix;
   means for configuring said second switching matrix differently from said first switching matrix;
   means, coupled to said first and second switching matrices, for selecting only one of said first and second switching matrices to transfer said plurality of communication spans; and
   said first and second switching matrices further comprising first and second interconnect memories respectively, wherein said first and second switching matrix configuring means are arranged to load interconnect maps into said first and second interconnect memories, said interconnect maps may be similar or different one from the other.

* * * * *

UNITED STATES PATENT AND TRADEMARK OFFICE
CERTIFICATE OF CORRECTION

PATENT NO.  : 4,964,105
DATED       : October 16, 1990
INVENTOR(S) : Duane E. Schrodt, et al.

It is certified that error appears in the above-identified patent and that said Letters Patent is hereby corrected as shown below:

```
Col. 6, line 57, after "Thus" insert a comma;
Col. 6, line 58, delete the comma after "continue".
Col. 13, line 41 (Claim 22, line 3), "witch" should
                 be --switch--;
Col. 13, line 55 (Claim 24, line 4) after "existing"
                 delete the comma.
```

Signed and Sealed this

Twenty-eighth Day of January, 1992

Attest:

HARRY F. MANBECK, JR.

*Attesting Officer*     Commissioner of Patents and Trademarks